US012007717B2

(12) United States Patent
Loke et al.

(10) Patent No.: US 12,007,717 B2
(45) Date of Patent: *Jun. 11, 2024

(54) DOUBLE ESCAPEMENT MECHANISM FOR A WATCH OR CLOCK

(71) Applicants: Donald Loke, Danbury, CT (US); Corey Loke, Guilford, CT (US)

(72) Inventors: Donald Loke, Danbury, CT (US); Corey Loke, Guilford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,605

(22) Filed: Aug. 30, 2022

(65) Prior Publication Data

US 2023/0315017 A1 Oct. 5, 2023

Related U.S. Application Data

(63) Continuation of application No. 17/707,022, filed on Mar. 29, 2022, now Pat. No. 11,442,408.

(51) Int. Cl.
*G04B 15/14* (2006.01)
*G04B 15/08* (2006.01)

(52) U.S. Cl.
CPC ............. *G04B 15/08* (2013.01); *G04B 15/14* (2013.01)

(58) Field of Classification Search
CPC ........ G04B 15/08; G04B 15/14; G04B 15/10; G04B 15/06
See application file for complete search history.

(56) References Cited

U.S. PATENT DOCUMENTS 8,303,167 B2 * 11/2012 Dehon .................. G04B 15/10 368/129
2011/0119506 A1 * 5/2011 Tsai ........................ H04L 12/10 713/300
2011/0222377 A1 * 9/2011 Ching ................. G04B 17/222 368/175

(Continued)

*Primary Examiner* — Sean Kayes
(74) *Attorney, Agent, or Firm* — Law Offices of Albert Wai-Kit Chan, PLLC; Robert D. Katz, Esq.

(57) ABSTRACT

A double escapement mechanism for a watch, clock, or other timepiece. The mechanism comprises first and second escape wheels; a first geared drive wheel having a plurality of teeth for rotating the first escape wheel and a second geared drive wheel having a plurality of teeth for rotating the second escape wheel, the first and second geared drive wheels positioned below and concentric with the first and second escape wheels; a balance wheel positioned above the first and second escape wheels and mounted for rotational movement; a hairspring concentric with the balance wheel and positioned below the first and second geared drive wheels; a roller table having first and second impulse jewels positioned thereon and a roller jewel positioned therebetween; first and second arcuate levers for locking and unlocking the adjacent escape wheel and adjacent to the first and second escape wheels, each arcuate lever having a jewel positioned thereon for locking and unlocking the adjacent escape wheel; a passing spring having a blade positioned between the first and second arcuate levers and extending to the roller table, such that the roller table jewel can deflect the passing spring toward the first arcuate lever to unlock the first escape wheel and can deflect the passing spring toward the second arcuate lever to unlock the second escape wheel.

6 Claims, 11 Drawing Sheets

(56) References Cited

U.S. PATENT DOCUMENTS

| | | | | |
|---|---|---|---|---|
| 2012/0207000 A1* | 8/2012 | Journe | G04B 15/06 | 368/132 |
| 2013/0215723 A1* | 8/2013 | Forsey | G04B 17/06 | 368/127 |
| 2017/0269551 A1* | 9/2017 | Semon | G04B 15/02 | |

* cited by examiner

DOUBLE ESCAPEMENT MECHANISM FOR A WATCH OR CLOCK

FIELD OF THE INVENTION

This invention relates to devices for watches, clocks, or other timepieces and timekeeping devices and more particularly to an improved double escapement mechanism to increase the accuracy of a watch or clock in which the double escapement mechanism is included.

BACKGROUND OF THE INVENTION

The original double escapement mechanism was invented by Abraham Louis Breguet for use in a Pocket watch in the late 18th century. Preceding that, the English Clockmaker Thomas Mudge in 1755 created a single escapement mechanism using a lever. Breguet's escapement Naturel did not appear to work perfectly because of an inability to machine tolerances sufficiently precisely given the available machinery at the time. It had an inherent problem of tripping or rapid fluttering as the power escaped. Breguet died before he was able to overcome these deficiencies.

Work on the double escapement did not advance even though watch and clockmakers realized the value of Breguet's device. George Daniels, a British watchmaker working in the 20th Century, tweaked Breguet's naturel escapement to make it more reliable. To do this, he gave each of the two escape wheels its own individual mainspring and gear train power supply. This improvement overcame some of the problems with the Breguet Device, but still used a lever to release the train which increased the friction and it essentially placed two movements in one wristwatch.

Another English watchmaker, Derek Pratt, also sought to improve the double escapement. His solution derived from incorporating features of a tourbillion (also invented by Abraham Louis Breguet). This version seemed to work well in a pocket watch or clock but seemed too large for use in a wristwatch.

The next major improvement in a double escapement technology came in the 21$^{st}$ century. The improvement used silicon to fabricate both escape wheels but otherwise followed the structure and operation of Breguet's double escapement mechanism (see European Patent No. EP1041459 A). The use of silicon is said to provide improvements in accuracy of the mechanism and to enable its manufacture to the exacting tolerances necessary for effective operation. Nevertheless, the structure of this device may also cause some unnecessary friction and possible loss of accuracy due its use of a lever-based mechanism.

Notwithstanding the foregoing progress, room for improvement exists in accuracy and friction reduction and there is therefore a need to provide an improved double escapement mechanism for clocks and watches whose owners desire such precision in the timekeeping function of their watches.

SUMMARY OF THE INVENTION

The foregoing disadvantages are overcome, and important improvements are realized by the present invention of a double escapement mechanism for a watch, clock, or other timepiece. The mechanism comprises first and second escape wheels; a first geared drive wheel having a plurality of teeth for rotating the first escape wheel and a second geared drive wheel having a plurality of teeth for rotating the second escape wheel, the first and second geared drive wheels positioned below and concentric with the first and second escape wheels; a balance wheel positioned above the first and second escape wheels and mounted for rotational movement; a hairspring concentric with the balance wheel and positioned below the first and second geared drive wheels; a roller table having first and second impulse jewels positioned thereon and a roller jewel positioned therebetween; first and second arcuate levers for locking and unlocking the adjacent escape wheel and adjacent to the first and second escape wheels, each arcuate lever having a jewel positioned thereon for locking and unlocking the adjacent escape wheel; a passing spring having a blade positioned between the first and second arcuate levers and extending to the roller table, such that the roller table jewel can deflect the passing spring toward the first arcuate lever to unlock the first escape wheel and can deflect the passing spring toward the second arcuate lever to unlock the second escape wheel.

BRIEF DESCRIPTION OF THE DRAWINGS

The foregoing and other disadvantages of previous devices are overcome, and further features and advantages of the invention will become apparent upon review of the following detailed description of the preferred embodiments taken in connection with the attached drawings, in which.

DETAILED DESCRIPTION OF THE PREFERRED EMBODIMENTS

Figure 1:
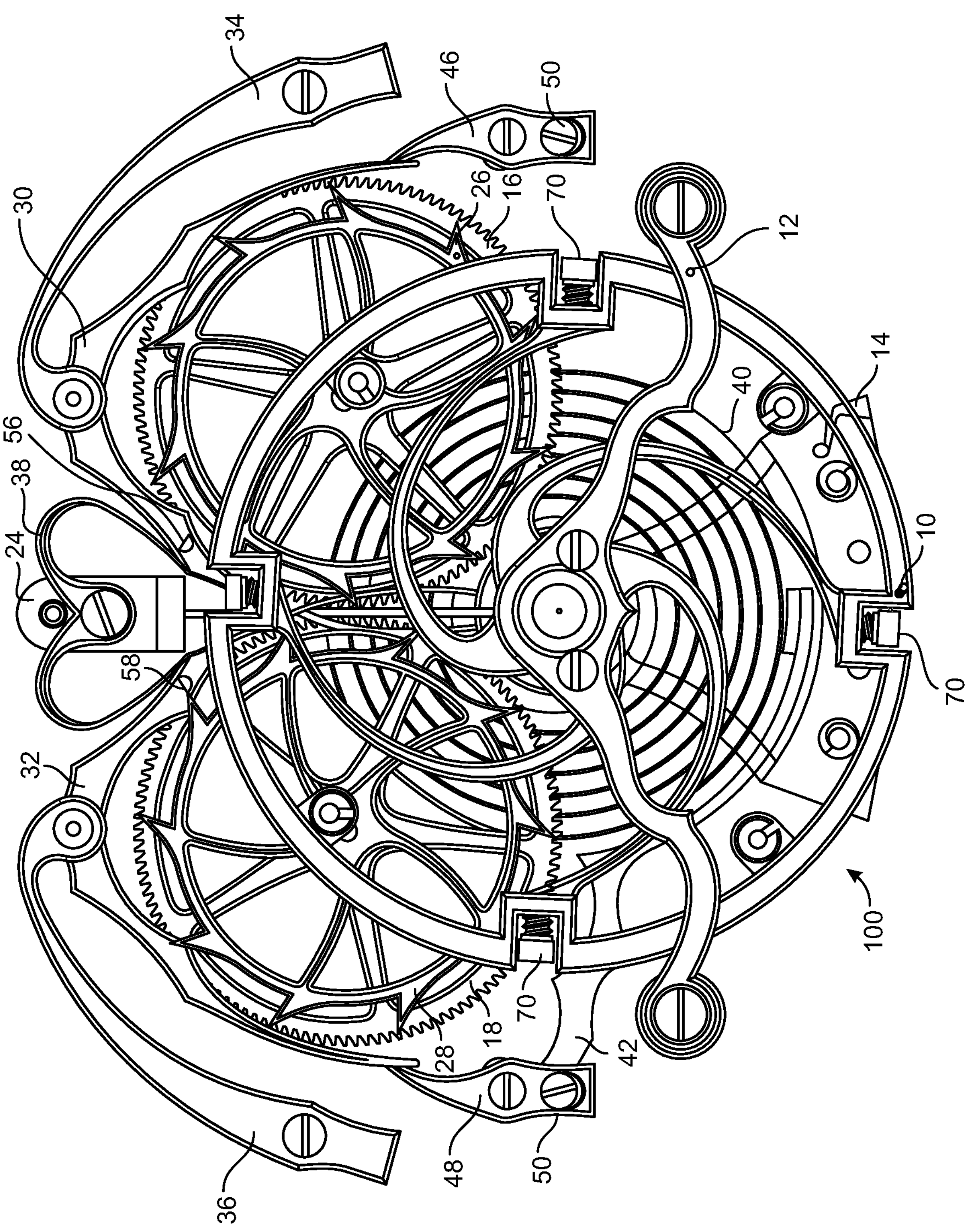
FIG. 1 is a plan view taken from the top (dial side) showing the front of a portion of a mechanical watch movement including the double escapement mechanism of the present invention.
Figure 2:
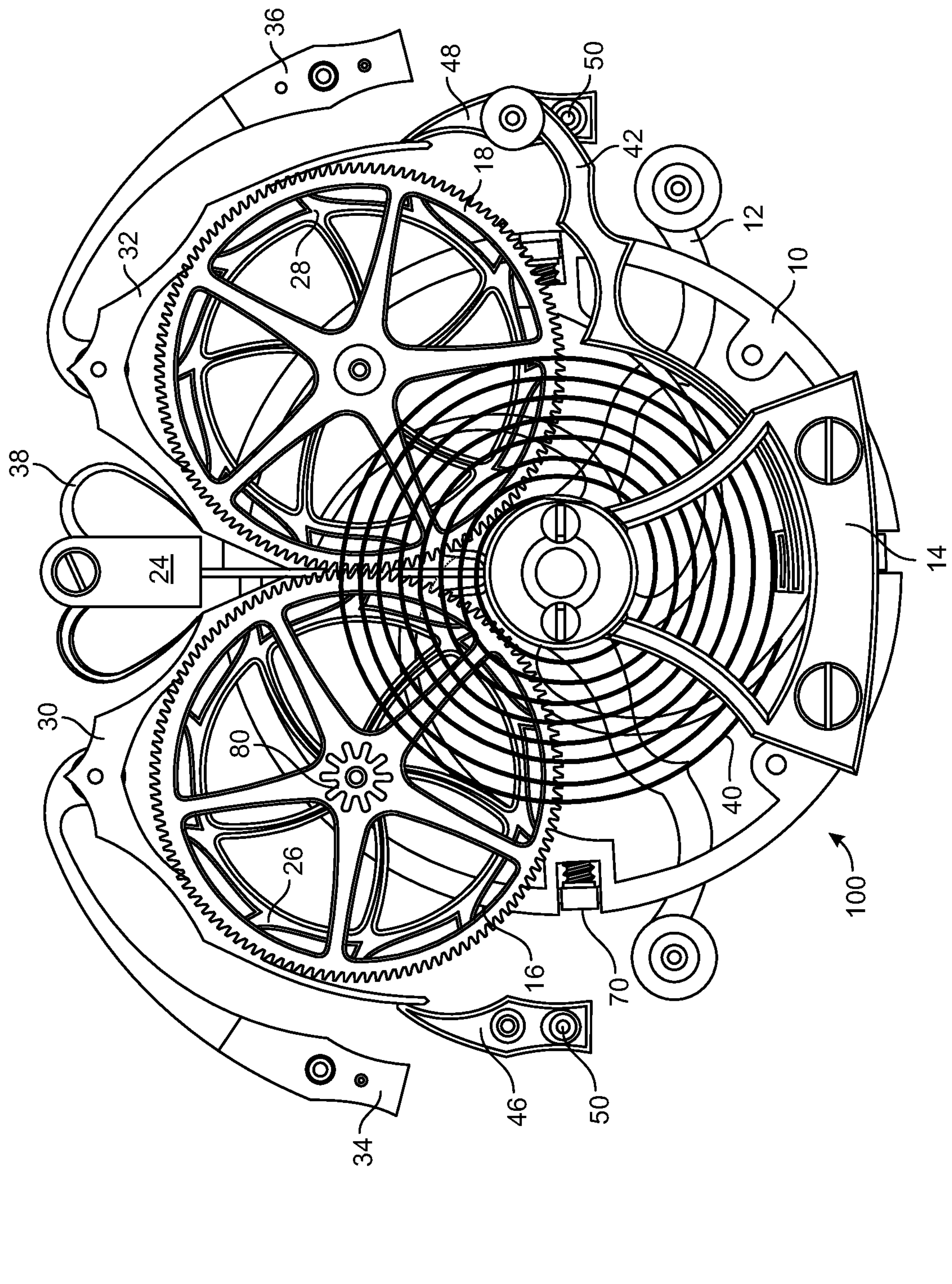
FIG. 2 is a plan view taken from the bottom (mount side) of a portion of a watch movement including the double escapement mechanism shown in FIG. 1.

Turning to the drawings, FIG. 1 depicts a portion of a watch movement including the improved double escapement mechanism of the present invention, generally designated by the reference numeral 100. The present invention may be used in a clock, watch movement, timepiece, or other analog mechanical timekeeping device, and couples with a conventional mechanical energy source including a mainspring and barrel that stores potential energy provided by the mainspring by manually winding or an automatic winding mechanism (not shown). The barrel (not shown) connects to a series of gears calculated to match the frequency of the balance wheel and hairspring, which form the basis of the timekeeping mechanism. The barrel drives the center or second wheel (not shown), which in turn drives the third wheel (not shown), which in turn drives the fourth wheel (not shown), which in turn drives the escape pinion 80 located below the drive wheels 16, 18 and is concentric with the first drive wheel 16 and the first 26 escape wheel. As shown in FIG. 2, the escape pinion 80 is a small gear with teeth that are rotated by the fourth wheel (not shown), which in turn through a series of gears is driven by the mainspring (not shown).

Figure 3:
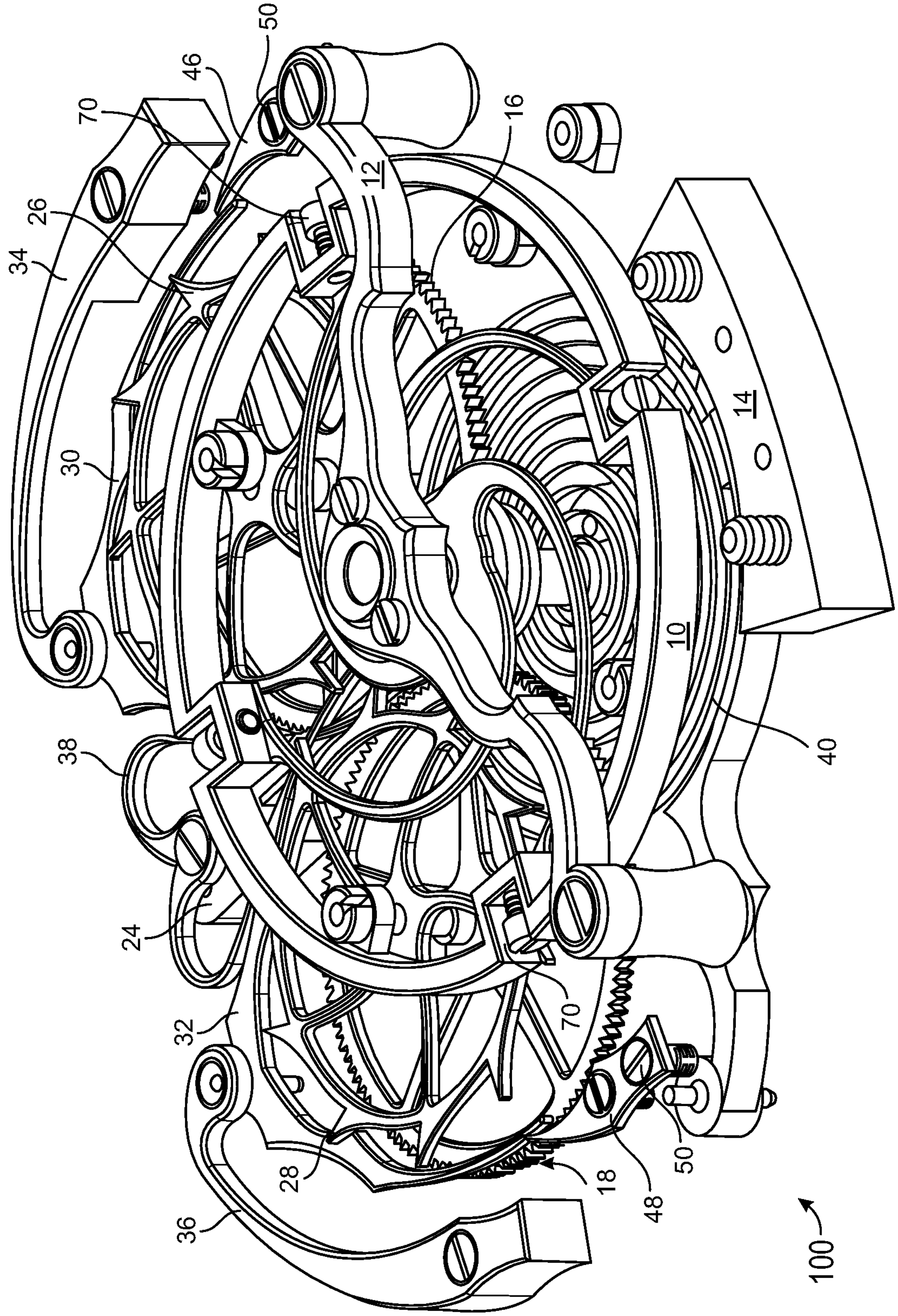
FIG. 3 is a front perspective view showing the parts of the double escapement mechanism of FIG. 1.
Figure 4A:
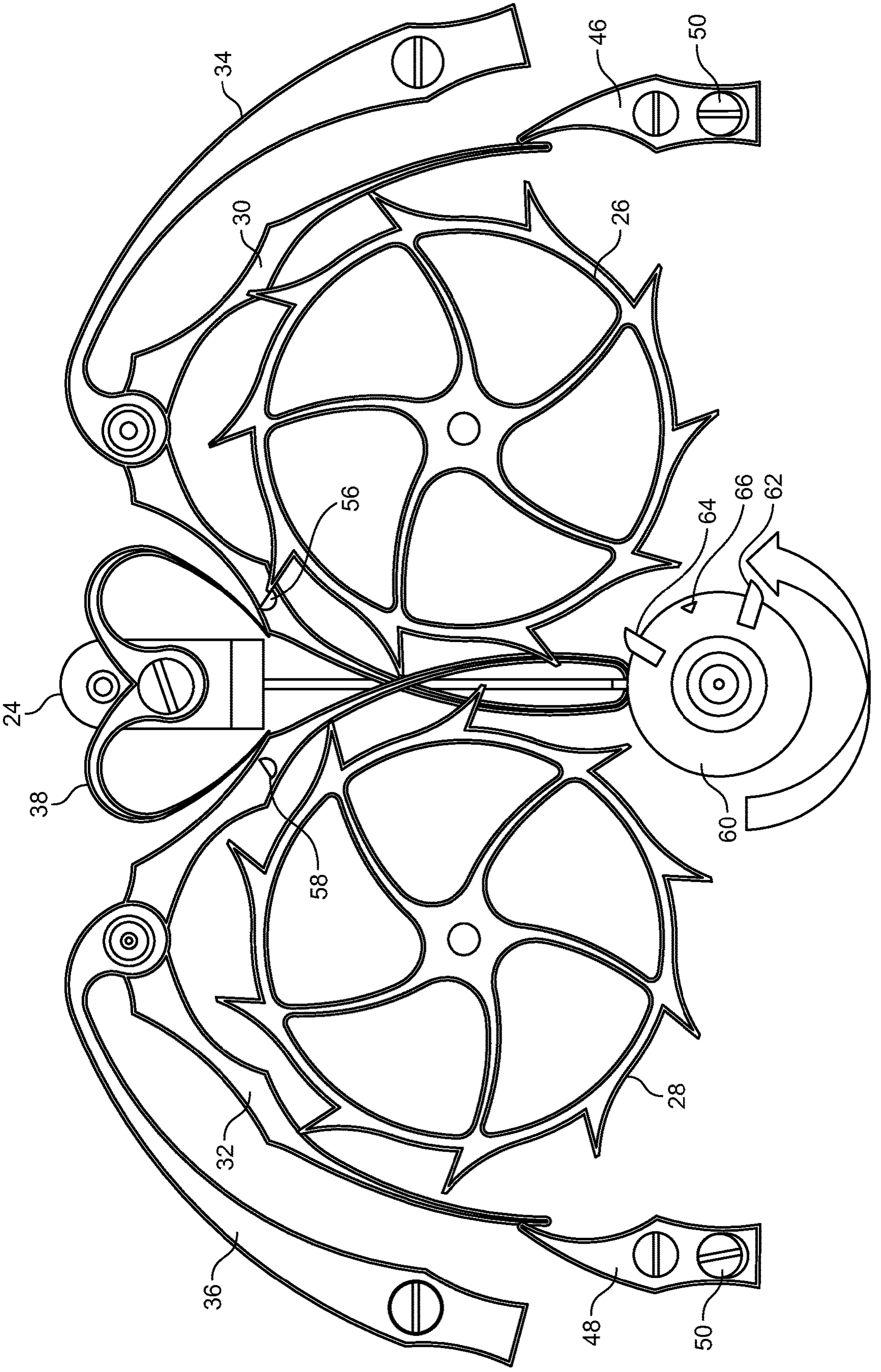
FIGS. 4*a* through *h* are a sequence of views of a portion of the double escapement mechanism shown in FIG. 1 to demonstrate its operation.

The basic parts of the double escapement mechanism 100 of the present invention include a balance wheel 10, a hairspring 40, and a pair of drive wheels 16, 18. Located on top of the two drive wheels 16, 18 are first and second escape wheels 26, 28, which are located on either side of a passing spring 24 and a heart-shaped spring 38. Each of the first and second escape wheels 26, 28 has a first or second arcuate lever 30, 32 for locking and unlocking the adjacent escape wheel associated therewith and adjacent thereto. For convenience of understanding, the arcuate levers resemble in shape, "batwings." The first drive wheel 16 is driven by the escape wheel pinion 80 that is powered by the gears driven by the mainspring (not shown). The second drive wheel 18 is driven by the first drive wheel 16. The arcuate levers 30, 32 include pivotable locking and unlocking arms that work together with the nearby first or second escape wheels 26, 28. The portion of the arcuate levers 30, 32 on each side closest to the passing spring 24 has a D-shaped jewel mounted thereon 56, 58, which faces upward, as shown in FIG. 1. The balance wheel 10 has timing screws 70 located in each quadrant of the balance wheel 10 to provide precision timing of the balance wheel 10, as illustrated in FIGS. 1 and 3. The double escapement mechanism of the present invention 100 also includes a roller table 60 centrally located beneath the two escape wheels, as shown in FIG. 4*a*. The roller table 60 has first and second impulse jewels 62, 64 extending axially and spaced apart a predetermined distance and mounted on the outer portion of the roller table 60, as also shown in FIG. 4*a*. Between the two impulse jewels 60, 62 lies an upright roller table jewel 66. Preferably, the first and second impulse jewels 60, 62 are shaped like trapezoids, but have a rounded outer edge instead of a linear one. The rounded outer edge permits the impulse jewel to allow an adjacent part to roll with it to reduce friction (rolling friction instead of sliding friction). The passing spring 24 has an upper base portion that attaches to the mainplate on the watch movement (not shown) and a longitudinally extending arm that extends as far as the outer portion of the roller table 60. The passing spring arm 24 is also located between the ends of the arcuate levers 30, 32, as seen in FIGS. 1 and 4*a*. Above the balance wheel 10 is the upper balance bridge 12, see FIG. 3, which secures the balance wheel 10 at a central point so that the balance wheel 10 and the hairspring 40 are coaxial and free to rotate. The upper balance bridge 12 fastens to the mainplate that fits within the watch case (not shown). Similarly, a lower balance bridge 14 sits underneath the hairspring 40 and also attaches to the movement on the mainplate. The lower balance bridge 14 includes an opening that is coaxial with the balance wheel 10 and the hairspring 40 allowing them to freely rotate.

The first and second arcuate levers 30, 32 are attached to the mainplate (not shown) by first and second arcuate lever bridges 34, 36, which allow the arcuate levers 30, 32 to pivot back and forth, as shown in FIG. 3. At the other end of the arcuate levers 30, 32 are first and second banking bridges 46, 48, which prevent the arcuate levers 30, 32 from moving beyond their desired paths. Each banking bridge 46, 48 has a cam screw 50 to adjust the banking bridge, see FIGS. 1-3.

Figure 4B:
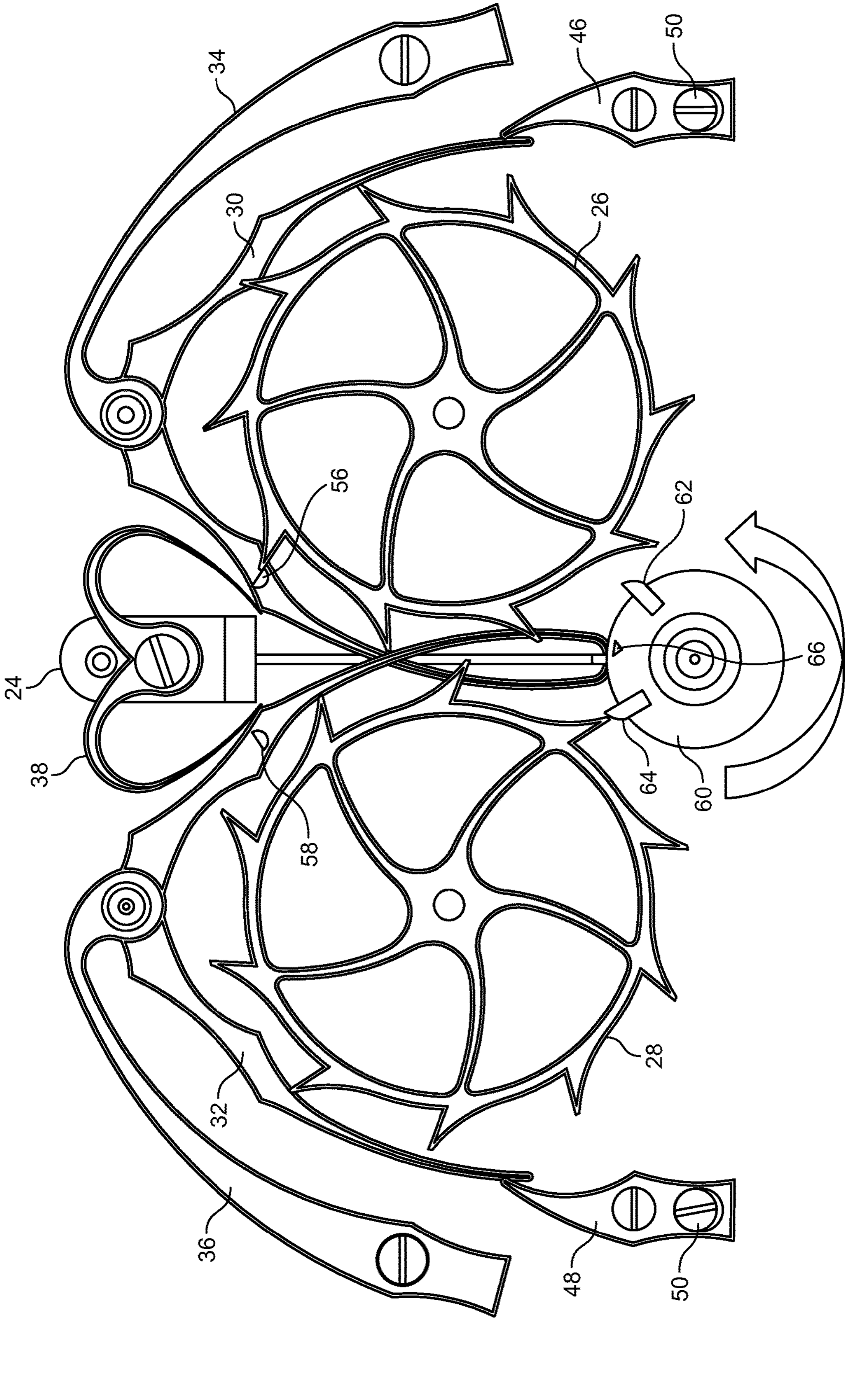
Figure 4C:
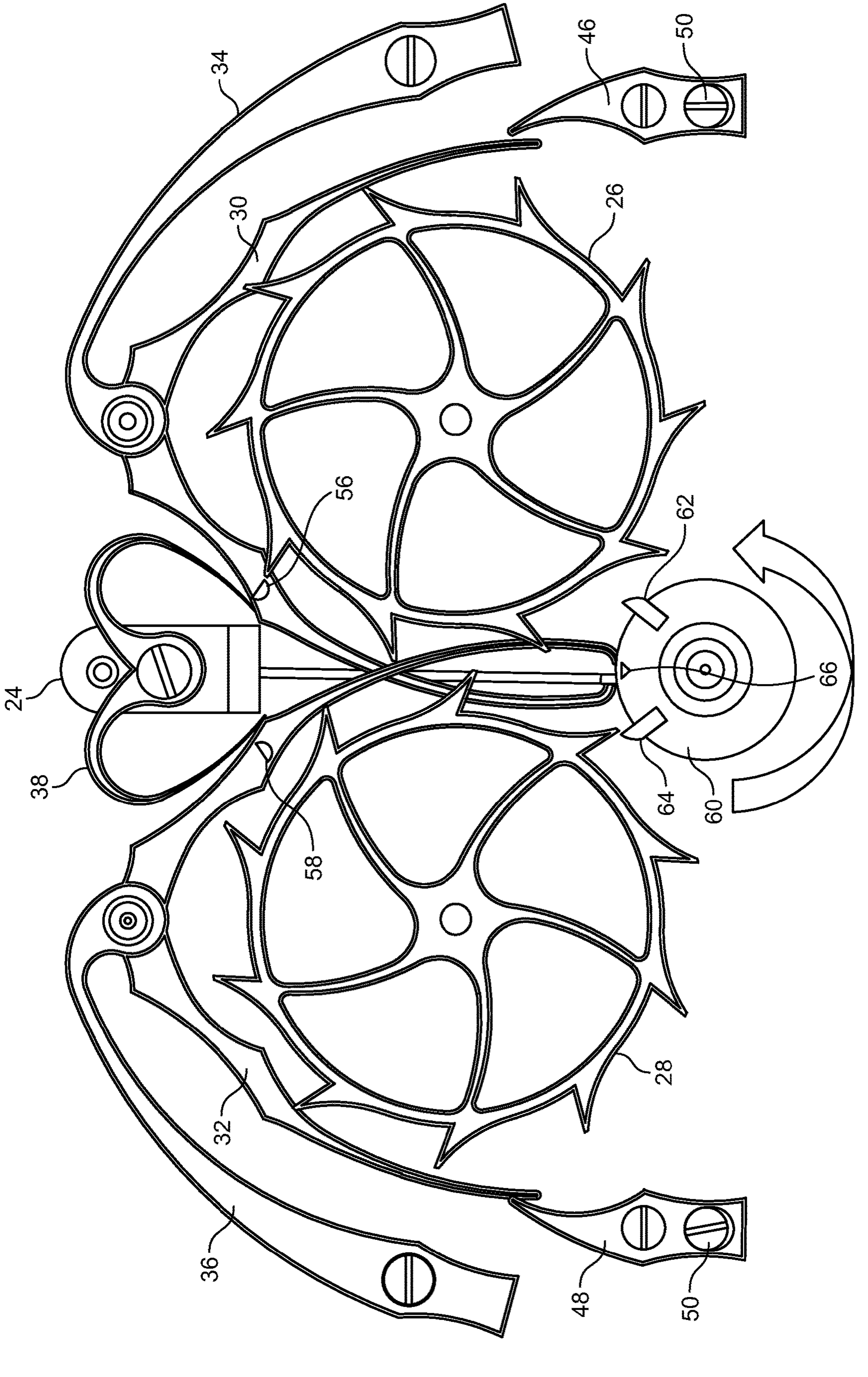
Figure 4D:
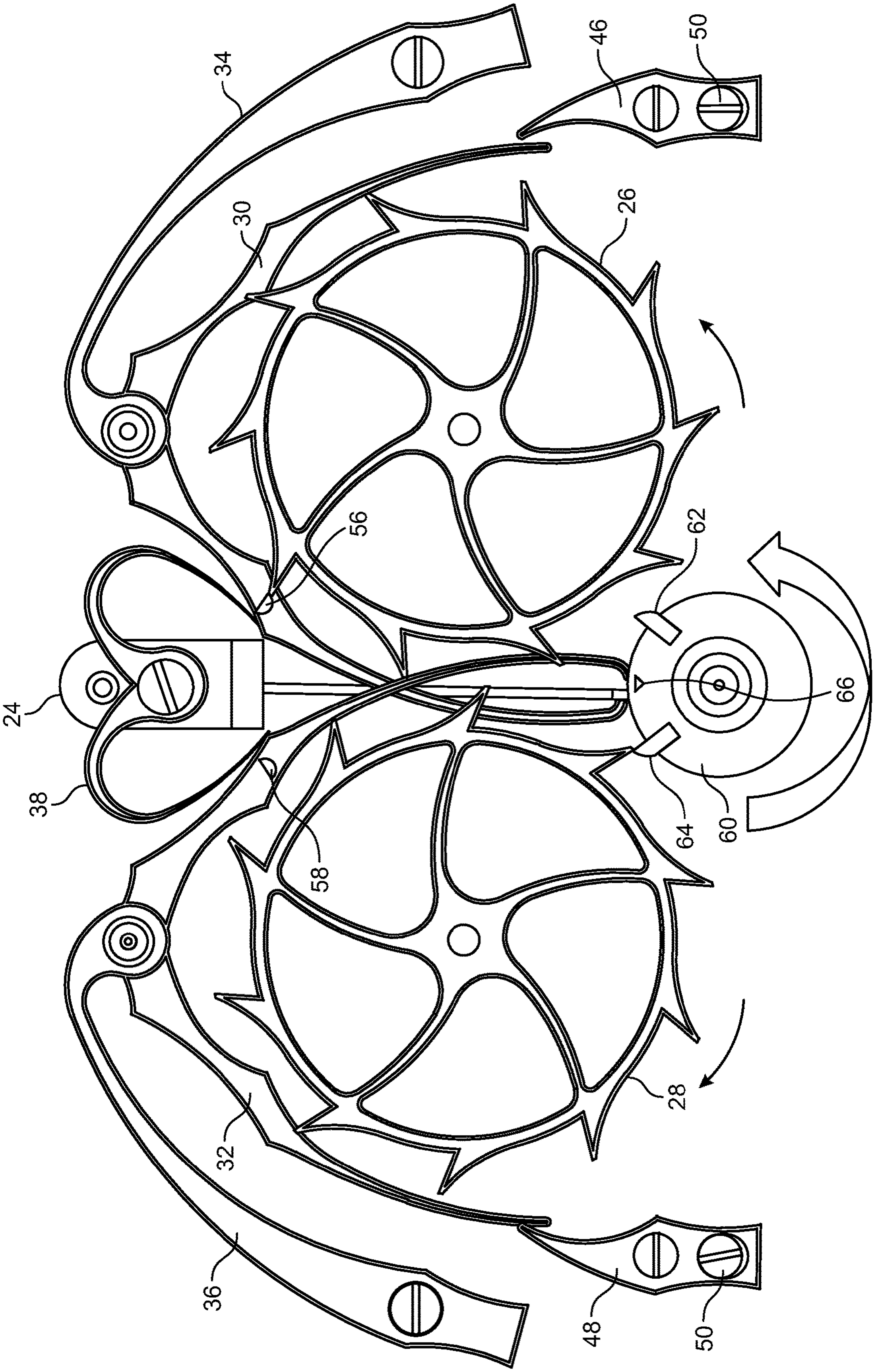
Figure 4E:
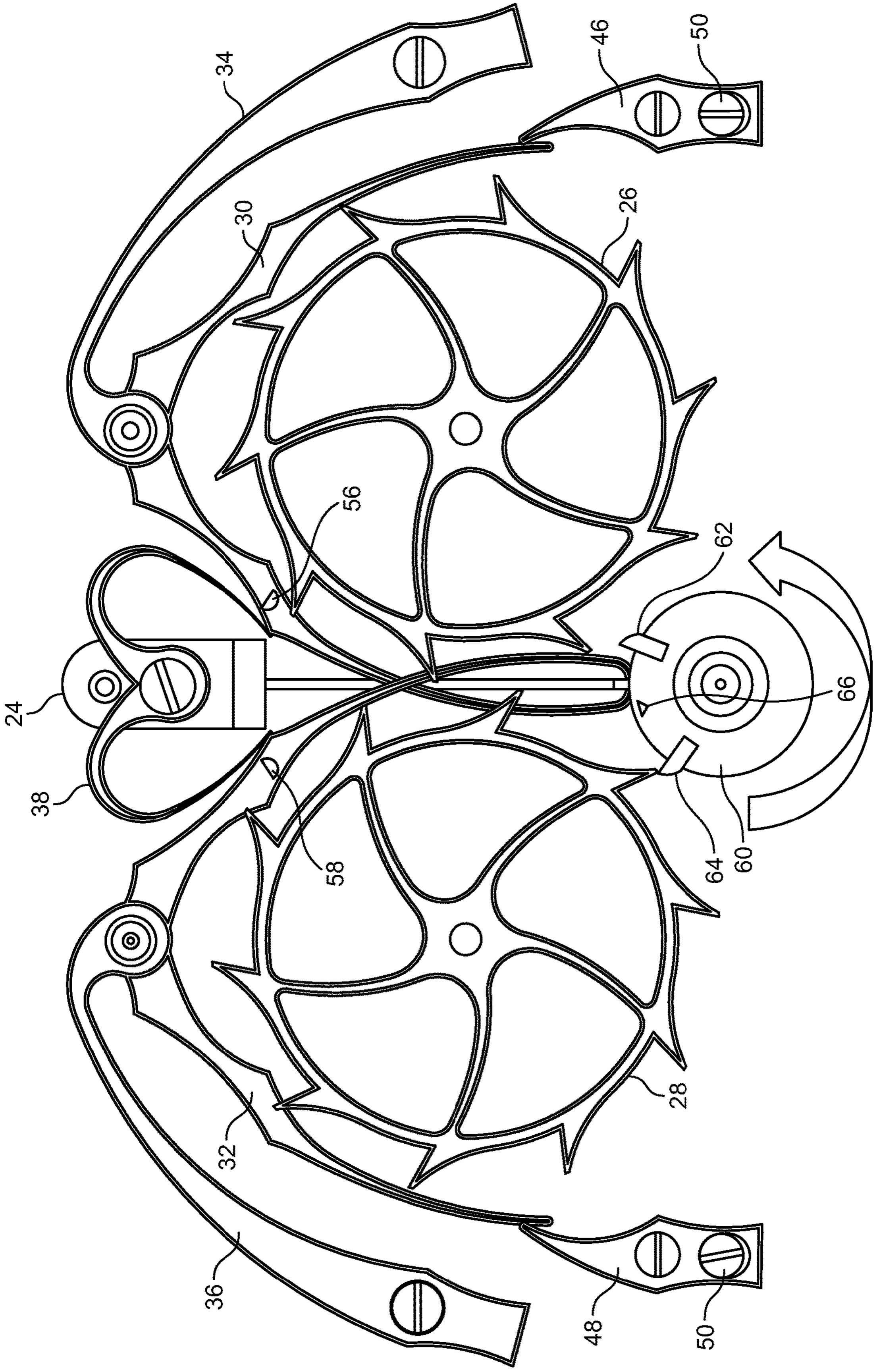
Figure 4F:
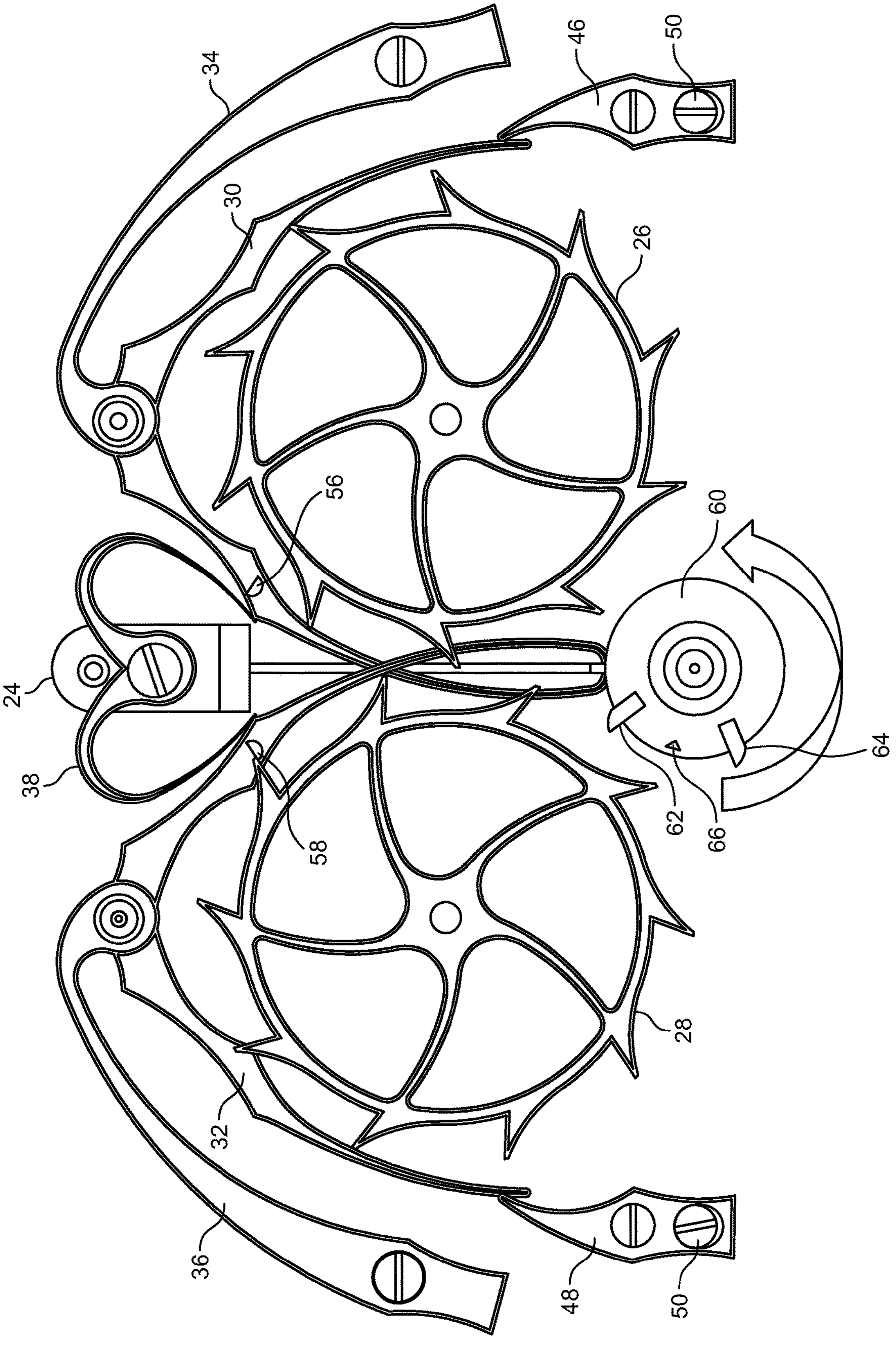
Figure 4G:
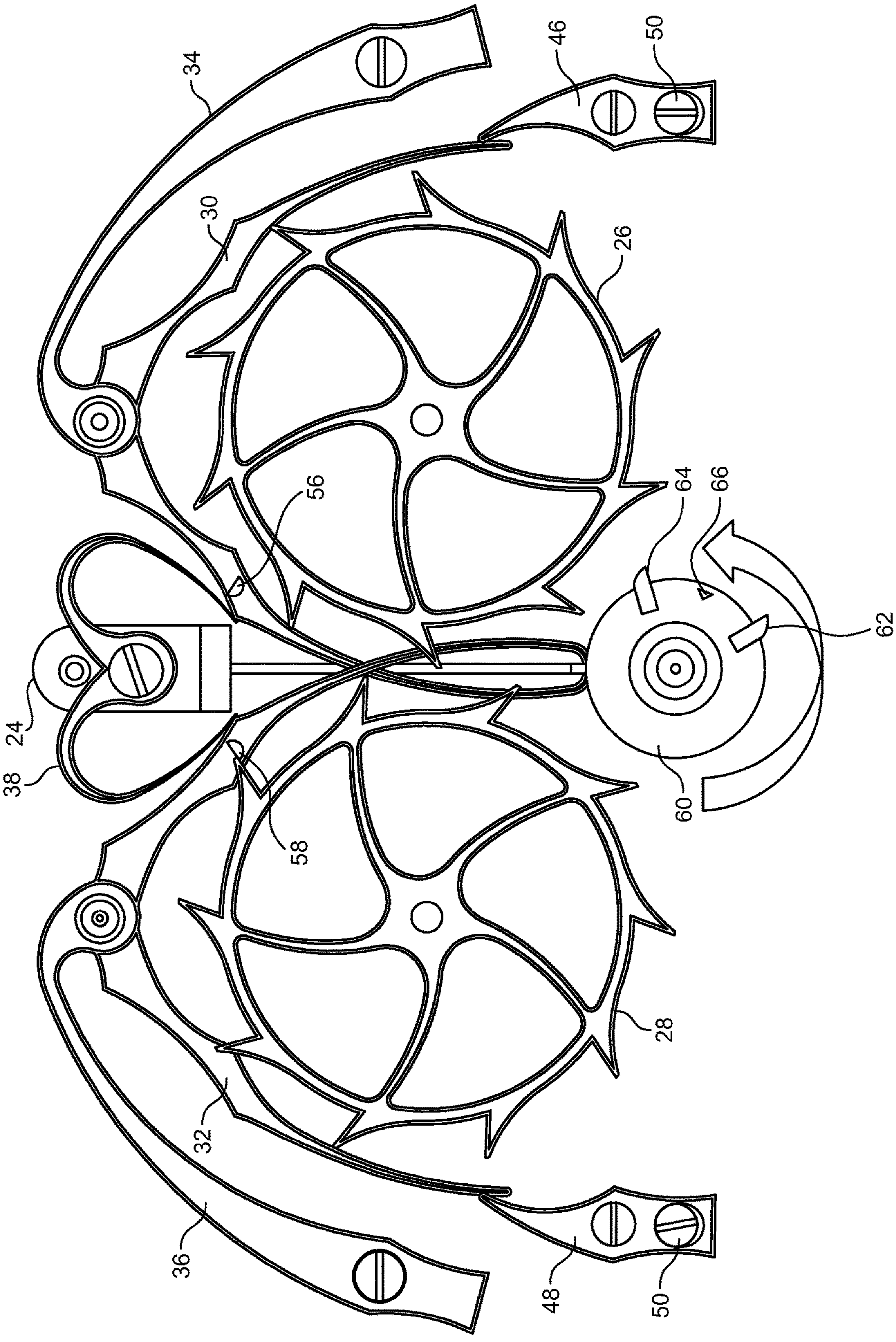
Figure 4H:
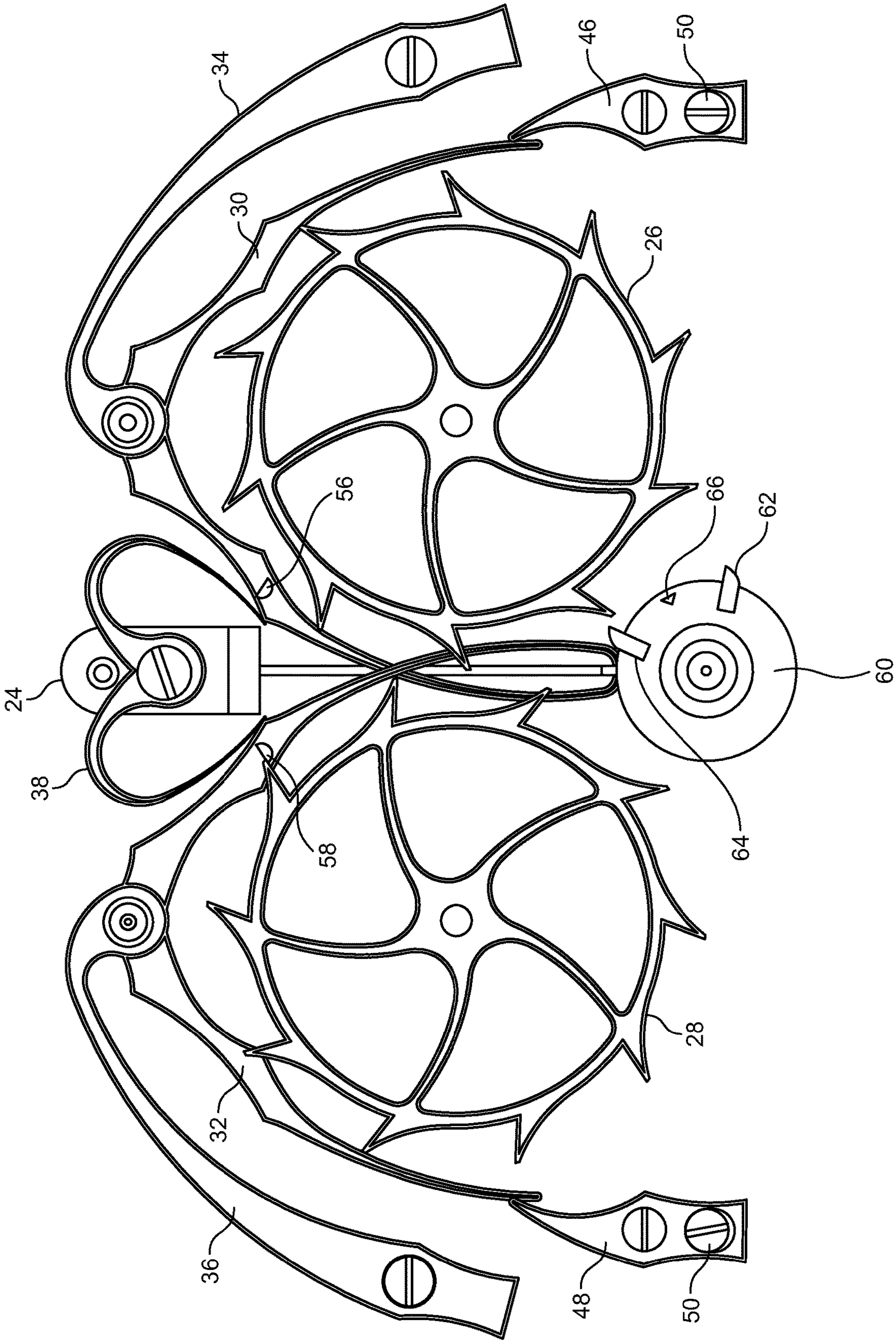

FIGS. 4*a* through *h* illustrate the operation of the double escapement mechanism of the present invention in step-by-step fashion as the mechanism unlocks the first escapement wheel 26. FIG. 4*a* shows the double escapement mechanism at the start of a rotation. In FIG. 4*a*, as the roller table 60 begins rotation, the first escape wheel 26 is locked. As shown in FIG. 4*b*, the next phase, the roller jewel 66 begins to lift the passing spring 24 to unlock the first escape wheel, although at this point the first escape wheel 26 remains locked. In FIG. 4C, the roller jewel 66 on roller table 60 continues to move the passing spring 24 which lifts the arcuate arm 30 in turn moving locking stone 56 out of the path of rotation of first escape wheel 26, unlocking the tooth. The escape wheels 26, 28 are now unlocked and may rotate. In FIG. 4D, the escape wheels 26, 28 have both rotated (driven by drive wheels 16, 18). A tooth on second escape wheel 28 is now able to make contact with impulse stone 64 on roller table 60 thus giving direct impulse to the balance wheel 10. In FIG. 4E second escape wheel 28 has moved through the extent of impulse and now is free from impulse stone 64. In FIG. 4*f* the second escape wheel 28 has now locked on locking stone 58 attached to arcuate arm 32. The balance wheel 10 rotates freely through FIG. 4*g* until FIG. 4*h* where it is constrained by the hairspring 40, and then the balance wheel 10 reverses direction and the process repeats in reverse.

The double escapement mechanism provides a direct impulse to the balance wheel in both directions. The geometry of the design eliminates or greatly reduces the engaging and disengaging friction by using a spring rather than a lever to provide rolling friction. The parts roll over one another instead of sliding as with previous designs. Other forms of a double wheel escapement unlock using a lever which has sliding friction when the roller jewel engages with the fork of the lever, which then unlocks the locking jewel, and has sliding friction as it is unlocking. The lever itself also has friction in the two pivot points in the lever itself. Other chronometer escapements gave the balance wheel an impulse in one direction only even though it is unlocked using a passing spring. The impulse is in one direction only, and in the other direction there was no impulse, which caused a loss of timekeeping precision. The chronometer escapement was prone to tripping if it absorbed a shock. The present invention provides a double wheel escapement that uses two chronometer escapements with a double spring detent escapement that provides an impulse in both directions and requires no oiling to operate properly.

It should now be apparent to one of ordinary skill in the art that a spring detent double escapement has been disclosed that provides a double impulse by virtue of the two escape wheels using a passing spring to interact with the jewel on the roller table to create the impulse that moves the escape wheel, which provides significant advantages over prior devices. In a chronometer escapement, for example, there is an impulse in one direction only, while in the other direction there is free oscillation. Likewise, in a spring or pivoted détente chronometer escapement, there is also an impulse in a single direction and free oscillation in the other direction. Other types of double escapements use a lever to create the impulse that moves the escape wheel or wheels, but this also introduces friction that may affect the timekeeping function of the device. The double wheel escapement of the present invention uses a spring détente to avoid the friction generated in other double escapements.

Many modifications and variations of the present device may be apparent to those of ordinary skill in the art upon reviewing the foregoing specification and accompanying drawings. It is not intended that the present invention be limited to the embodiments disclosed herein but rather the invention includes all variations, modifications, and equivalents included in the appended claims.

What is claimed is:

1. A method based on double escapement mechanism for stabilizing the time kept by a watch, clock, or other timepiece, comprising:

a) setting up a first escape wheel and a second escape wheel;

b) placing a first geared drive wheel below and concentric with the first escape wheel, and placing a second geared drive wheel below and concentric with the first escape wheel, wherein both the first geared drive wheel and second geared drive wheel have a plurality of teeth; configuring the first geared drive wheel to rotate the first escape wheel, and configuring the second geared drive wheel to rotate the second escape wheel;

c) placing a balance wheel above the first escape wheel and the second escape wheel, wherein the balance wheel is mounted for rotational movement;

d) placing a hairspring concentric with the balance wheel and below both the first geared drive wheel and the second geared drive wheel;

e) providing a roller table;

f) placing first and second impulse jewels on the roller table;

g) placing a roller jewel between the first and second impulse jewels;

h) placing a first arcuate lever adjacent to the first escape wheel, and placing a second arcuate lever adjacent to the second escape wheel, wherein each of the first arcuate lever and the second arcuate lever has a jewel position thereon for locking and unlocking an adjacent escape wheel; configuring the first arcuate lever to lock and unlock the first escape wheel, and configuring the second arcuate lever to lock and unlock the second escape wheel; and i) placing a passing spring between the first and second arcuate levers, wherein the passing spring has a blade and extends to the roller table; configuring the roller table jewel to deflect the passing spring toward the first arcuate lever to unlock the first escape wheel, and to deflect the passing spring toward the second arcuate lever to unlock the second escape wheel, thereby stabilizing the time kept by the watch, clock, or other timepiece.

2. The method according to claim 1, wherein step h) further comprises configuring an additional spring means to hold the first arcuate lever in a predetermined position adjacent to the first escape wheel and to hold the second arcuate lever in a predetermined position adjacent to the second escape wheel.

3. The method according to claim 1, wherein step e) further comprises configuring the roller table to be concentric with the balance wheel and the hairspring and to be positioned for rotational movement between the balance wheel and the hairspring.

4. The method according to claim 1, wherein step a) further comprises configuring each of the first and second escape wheels to have a plurality of spaced apart teeth.

5. The method according to claim 1, wherein step i) further comprises configuring the passing spring to include a longitudinally extending flexible steel blade of approximately 0.1 millimeter in thickness.

6. The method according to claim 1, wherein step a) further comprises configuring the first escape wheel to rotate in a clockwise direction, and configuring the second escape wheel to rotate in a counterclockwise direction.

* * * * *